United States Patent [19]

Gottfried

[11] Patent Number: 4,498,015

[45] Date of Patent: Feb. 5, 1985

[54] FLYWHEEL DEVICE FOR A MOVING VEHICLE

[76] Inventor: Mario H. Gottfried, Mexico City 21, D F/0400, Mexico

[21] Appl. No.: 449,487

[22] Filed: Dec. 13, 1982

[51] Int. Cl.³ ............................................. B60L 11/16
[52] U.S. Cl. .................................. 290/15; 290/1 R; 290/1 A; 290/4 R; 310/74; 318/150; 74/572; 74/5.22
[58] Field of Search ............... 290/15, 1 R, 1 A, 1 B, 290/1 C, 1 D, 1 E, 4 R; 74/5.22, 5.34, 5.37, 5.72, 385, 417; 310/74; 318/150

[56] References Cited

U.S. PATENT DOCUMENTS

| | | | |
|---|---|---|---|
| 1,079,259 | 11/1913 | Nehlsen | 318/150 X |
| 2,062,583 | 12/1936 | Kruczek | 74/5.22 X |
| 2,857,534 | 10/1958 | Beach | 310/74 |
| 3,022,433 | 2/1962 | Ferranti | 74/572 X |
| 3,030,517 | 4/1962 | Gibbons | 310/74 X |
| 3,052,129 | 9/1962 | Rocks | 74/5.34 |
| 3,185,873 | 5/1965 | Rosenfeld | 310/74 X |
| 3,424,401 | 1/1969 | Maurer | 74/5.34 X |
| 3,609,426 | 9/1971 | Gaul | 290/4 E X |
| 3,858,674 | 1/1975 | Tabor | 310/74 X |
| 4,088,041 | 5/1978 | Kraus | 74/572 |
| 4,223,240 | 9/1980 | Theyse | 310/74 |
| 4,309,620 | 1/1982 | Bock | 290/4 R |
| 4,358,719 | 11/1982 | Currier et al. | 318/150 X |
| 4,388,977 | 6/1983 | Bader | 310/74 X |

FOREIGN PATENT DOCUMENTS 18455 11/1980 European Pat. Off. ............. 310/74

Primary Examiner—J. V. Truhe
Assistant Examiner—Paul Shik Luen Ip
Attorney, Agent, or Firm—Dula, Shields & Egbert

[57] ABSTRACT

An energy storage device comprising three flywheels mounted mutually perpendicular on said shafts in three dimensions within a rigid enclosure. The shafts are interconnected within the enclosure through a bevel gear arrangement in which the motion of one flywheel is imparted to the other flywheels. The shafts pass through the walls of the enclosure through a bearing arrangement.

9 Claims, 3 Drawing Figures

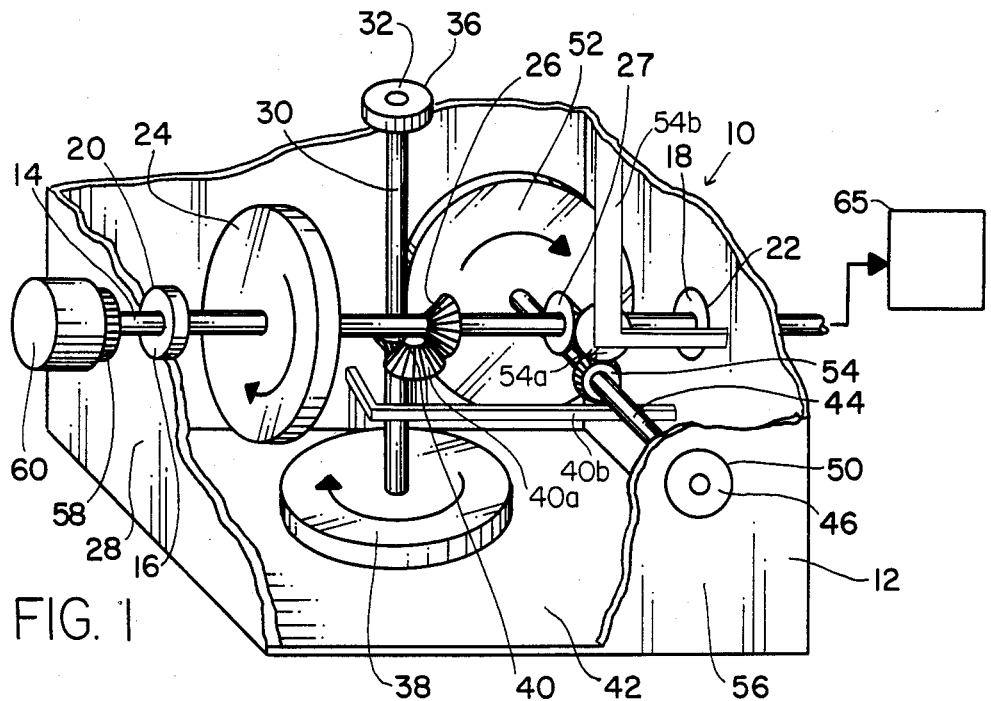
FIG. 1
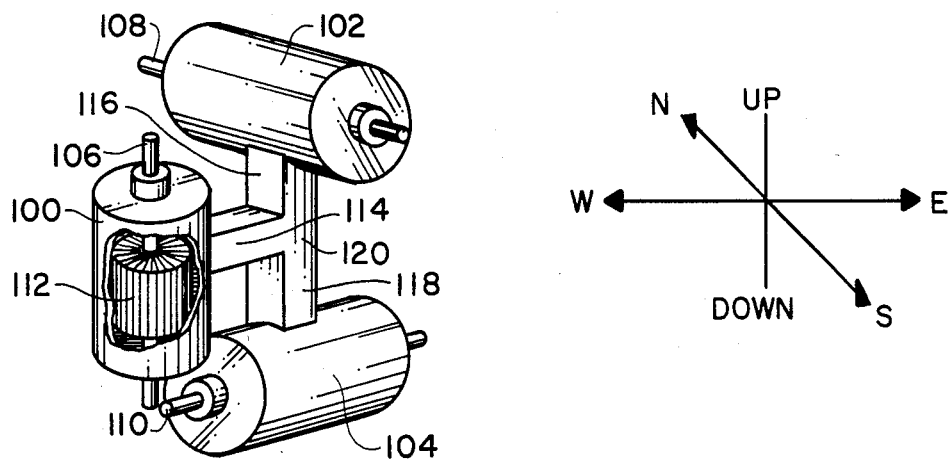
FIG. 2
FIG. 3

FLYWHEEL DEVICE FOR A MOVING VEHICLE

TECHNICAL FIELD

The present invention pertains to kinetic energy storage systems for use in moving vehicles. More particularly, the present invention pertains to energy storage systems utilizing an arrangement of flywheels for reducing and minimizing gyroscopic effects upon the moving vehicle.

BACKGROUND OF THE INVENTION

While flywheels are well known in the art, there has been very little application of flywheels in moving vehicles. Some flywheels have been used in automobile engines to smooth out the pulses of energy provided by the exploding gases in the cylinders and to provide energy for the compression stroke of the pistons. However, flywheels have seldom been used for storage of kinetic energy within the automobile.

The reason for the lack of usage of flywheels as kinetic energy storers in automobiles has been the gyroscopic effect of the flywheel upon the maneuverability of the vehicle. A spinning flywheel produces a strong gyroscopic effect; in other words, the flywheel strongly opposes the turning of the vehicle. This gyroscopic effect is magnified where the flywheel is either large or spinning at high speeds.

It is highly desirable to utilize flywheel systems to store kinetic energy in moving vehicles. For example, a train equipped with a kinetic energy storing flywheel could conserve a significant portion of that energy which was lost upon stopping the train. Similarly, the energy wasted in stopping an automobile could also be conserved and applied to accelerating the automobile or supplying the automobile with electrical power. Such a kinetic energy storage system could have vast application in the field of electric automobiles or other electrically powered vehicles.

The gyroscopic effect of a single flywheel arrangement clearly prohibits its widespread use as a kinetic energy storer in vehicles. If a single flywheel system were used to store much of the kinetic energy lost during the stoppage of a train, then the gyroscopic effect of the spinning flywheel could cause a train to derail every time it would go around a curve. Thus, it would be desirable to use a flywheel kinetic energy storing system without having to endure the undesirable characteristics of the gyroscopic effect.

It is an object of the present invention to provide a kinetic energy storage system with reduced and minimal gyroscopic effects.

It is a further object of the present invention to further the use of flywheels within vehicles without diminishing the maneuverability of the vehicle.

Other objects and advantages of the present invention will become apparent from a reading of the attached Claims and description of the preferred embodiments.

DISCLOSURE OF THE INVENTION

The present invention comprises a plurality of flywheel systems connected in such a manner as to minimize the gyroscopic effects of the flywheels. These flywheels are arranged such that they spin in axes that are ninety degrees (90°) from each other. In one embodiment, this may be accomplished by attaching each flywheel to a separate shaft extending through opposing sides of a closed container. One shaft extends from top to bottom, another from side to side along the length of the enclosure, and the third from side to side along the width of the enclosure. Each of the shafts is freely rotatable within a ballbearing arrangement mounted in each side of the enclosure. The shafts are geared into one another such that the equally sized flywheels will spin at the same rate.

In an alternative embodiment of the present invention, each of the flywheels is a rotor in an electric motor. The flywheel-rotor includes integrated windings, magnets and stator cores. The axes of these motors are arranged so as to be ninety degrees (90°) from each other. These electric motors are rigidly attached at a central area between them.

BRIEF DESCRIPTION OF THE DRAWINGS

FIG. 1 is a cut-away perspective view of the flywheel kinetic energy storage system, showing the relationship of the flywheels and the shafts within the enclosure.

FIG. 2 shows a cut-away perspective view of an alternative embodiment of the present invention featuring the rotors of electric motors as the flywheels.

FIG. 3 shows the axes of the flywheels.

BEST MODE FOR CARRYING OUT THE INVENTION

A kinetic energy storage system for moving vehicles according to the present invention is shown generally at 10 in FIG. 1. In FIG. 1, the kinetic energy storage system, including the flywheels and shafts, are contained within enclosure 12. Enclosure 12 is essentially a closed metal box of sufficient size to contain the included apparatus. The purpose of the enclosure 12 is to contain the flywheels in a nonhazardous environment and to maintain the shafts and flywheels in proper alignment.

First shaft 14 extends along and through the length of enclosure 12. First and second ballbearing arrangement 16 and 18 are interposed between the outer diameter of shaft 14 and the inner diameter of apertures 20 and 22 of enclosure 12, respectively. Ballbearing arrangements 16 and 18 permit the free rotating movement of shaft 14 about its axis. Ballbearing arrangements 16 and 18 are securely embedded into the walls of enclosure 12. Shaft 14 also includes first flywheel 24 and bevel gears 26 and 27. Flywheel 24 is securely mounted to the outer diameter of shaft 14 such that the center points of the shaft and the flywheel coincide. As shown in FIG. 1, both shaft 14 and flywheel 24 rotate in a counterclockwise direction as viewed from wall 28. Bevel gears 26 and 27 are also securely attached to the external diameter of shaft 14. Both flywheel 24 and bevel gears 26 and 27 are included within enclosure 12.

Second shaft 30 extends from the top to the bottom of enclosure 12. Third and fourth ballbearing arrangements 32 and 34 (not shown) are interposed between the outer diameter of shaft 30 and the diameter of the apertures 36 occurring at the top and bottom of enclosure 12. Ballbearing arrangements 32 and 34 are securely embedded into the walls of the enclosure. Second shaft 30 includes second flywheel 38, which is rigidly secured to the outer diameter of shaft 30 and rotates in a counterclockwise direction as viewed from wall 42 of enclosure 12. Bevel gear 40 is likewise securely mounted to the outer diameter of shaft 30 and meshes with bevel gear 26 of shaft 14.

Bevel gears 26 and 40 are connected by gear 40a. Gear 40a is supported in position and rotatably mounted to bracket 40b. The meshing of gears 26, 40, and 40a causes any motion generated through flywheel 24 to be imparted to flywheel 38.

Third shaft 44 extends between the walls forming the width of enclosure 12. Fifth and sixth ballbearing arrangements 46 and 48 (not shown) are interposed between the outer diameter of shaft 44 and the inner diameter of apertures 50 occurring in the walls of enclosure 12. Shaft 44 includes third flywheel 52 and bevel gear 54. Flywheel 52 is securely mounted to the exterior diameter of shaft 44 and rotates in a clockwise direction as viewed from wall 56 of enclosure 12.

Bevel gear 54 is similarly fixedly mounted on shaft 44 and meshes with bevel gear 27 of shaft 14. Bevel gears 27 and 54 are connected by gear 54a. Gear 54a is supported in position and rotatably mounted to bracket 54b. The meshing of gears 27, 54, and 54a causes motion from flywheel 24 to be imparted to flywheel 52.

Of critical importance in this embodiment of the invention is the plane of rotation of each of the flywheels. The plane of rotation of flywheel 24 is perpendicular to the planes of rotation of flywheels 38 and 52. The plane of rotation of flywheel 38 is similarly perpendicular to the planes of rotation of flywheels 24 and 52. Similarly, the plane of rotation of flywheel 52 is perpendicular to the planes of rotation of flywheels 24 and 38. It is the relationship of the planes of rotation which minimizes the gyroscopic effects within this kinetic energy system.

As seen in FIG. 1, kinetic energy is imparted into the system by the rotation applied to end 58 of shaft 14 by an input means. End 58 of shaft 14 may be geared into the braking system of a car such that the stopping of the car will cause the flywheels to spin at high velocity. Similarly, end 58 may be powered by a small motor 60, so that the flywheels could spin so as to build up and store energy during nonoperating time. The rotation of shaft 14 causes flywheel 24 to rotate, which, in turn, causes flywheels 38 and 52 to rotate. The rotation of these flywheels causes kinetic energy to be stored in accordance with the following formula:

$$KE = \tfrac{1}{2}IW^2$$
where, $I$ = the moment of inertia, and $W$ = angular velocity.

Kinetic energy is a form of energy that an object or particle has by reason of its motion. If work, which transfers energy, is done on an object by applying a net force, the object speeds up and thereby gains kinetic energy. The flywheels in the system produce the kinetic energy. This kinetic energy is transferred from system 10 to an output means 65. As shown in FIG. 1, output means 65 is operatively connected to the end of shaft 14. It may also be connected to the other shafts for further power generation capacity. Output means 65 may either store or directly use the kinetic energy. For example, output means 65 may be a battery that stores the energy produced by the system. Alternatively, it may be a generator that is used to power an electric motor for driving the wheels of a vehicle.

In operation, kinetic energy storing system 10 can be used in a moving vehicle without the problem of gyroscopic effects. In a moving vehicle, a single flywheel would create inertial effects that would make changing directions and maneuverability difficult. The present invention avoids this difficulty because the vectors of its inertial effects, namely the direction of rotation of the three flywheels, are simultaneously exerted in three perpendicular directions and thereby compensate one another. While the above system does not eliminate all gyroscopic effects, it does significantly reduce such effcts. Any gyroscopic effects that occur through this system can further be reduced by maintaining the interior of enclosure 12 in a vacuum or an inert gas.

In the system, power is stored as kinetic energy, thus the faster the flywheels spin, the more energy is stored. As advances are made in materials, bearings, and other technology, the size of the flywheels may be proportionately reduced with the higher revolutions per minute that may be introduced to the flywheels. As a result, this system could even be introduced into smaller moving vehicles. While the above embodiment shows a three flywheel system, it is not meant to act as a limitation on the invention. It would be possible to utilize more flywheels, so long as the inertial effects of rotation could be adequately compensated for.

An alternative embodiment of the present invention is shown in FIG. 2. As mentioned before, the critical element of this system is the flywheel. However, flywheels come in an infinite variety of shapes, sizes, qualities, and configurations. FIG. 2 shows one example of the system where the flywheel is the rotor of an electric motor.

In FIG. 2, electric motors 100, 102 and 104 act as the flywheels and shafts of the kinetic energy storage system in this embodiment. Motors 100, 102 and 104 have shafts 106, 108 and 110, respectively, extending through the central axis of the motors. Each of the shafts has a rotor 112 rigidly attached thereto. Rotor 112 may be a magnetic element having copper windings extending there around. The shafts 106, 108 and 110 are rotatably mounted within electric motors 100, 102 and 104, respectively. Although the rotor 112 is far removed in appearance from the flywheels of the previous embodiment, it performs in exactly the same manner as the previous embodiment. The planes of rotation of rotors 112 are in three perpendicular directions, as indicated in FIG. 3. Thus, vectors of the inertial effects of the rotation of the rotors within the motors are simultaneously exerted in three perpendicular directions and compensate for one another. Because of the need for compensating effects, the motors 100, 102 and 104 must have similar specifications. Likewise, the speed of rotation of the rotor on shafts 106, 108 and 110 must be approximately equal. If there is any disparity, then the gyroscopic effects will not be effectively compensated for.

Motors 100, 102 and 104 have arms 114, 116, and 118 extending therefrom. These arms are rigidly connected in center area 120. This rigid connection maintains the motors in their proper alignment for minimizing gyroscopic effects. The main advantage of this embodiment of the present invention is that this combination of flywheel arrangements minimizes the gyroscopic effect created by the rotor itself. If a single electric motor were used to power a moving vehicle, the rotor itself would cause gyroscopic effects. This could greatly hamper the maneuverability of the vehicle, depending on the size and weight of the rotor. By combining the motors in the arrangement shown in FIG. 2, such that the planes of rotation are perpendicular, any inertial effects created by the rotor spinning in the motor are compensated for, thereby reducing the gyroscopic effect. In larger applications, a similar arrangement could be used on electrically powered locomotives. For example, where the electrically powered locomotive has a single electric motor having a gigantic rotor, the gyroscopic effects could cause the train to derail through the resistance to turning motions. In the embodiment shown in FIG. 2, however, this gyroscopic effect is compensated for by having three motors of smaller size arranged perpendicular to one another. As a result, the train could avoid the gyroscopic effects by having its single electric motor replaced by the arrangement of three smaller motors in the configuration of the present invention.

The foregoing disclosure and description of the invention are illustrative and explanatory thereof, and various changes in the details of the illustrated apparatus may be made within the scope of the appended Claims without departing from the true spirit of the invention. The embodiments shown above are illustrative only and are not intended to limit the scope of the present invention, which should be interpreted only according to the appended Claims and their legal equivalents.

I claim:

1. An apparatus for storing kinetic energy comprising:
    a first flywheel means mounted on a first rotatable shaft extending in a first plane;
    a second flywheel means mounted on a second rotatable shaft extending in a second plane perpendicular to said first plane;
    a third flywheel means mounted on a third rotatable shaft extending in a third plane perpendicular to said second plane and perpendicular to said first plane;
    said first, second and third flywheel means, including a frame means, for maintaining said first, second and third rotatable shafts in fixed position in relation to said first, second and third planes;
    kinetic energy input means connected to one of said first, second and third rotatable shafts for initiating and maintaining rotational movement of said first, second and third flywheel means; and
    output means for converting said rotation of said first, second and third flywheel means into potential energy.

2. The apparatus of claim 1, said first, second and third flywheel means being of generally similar size, shape and configuration.

3. The apparatus of claim 2, said first, second and third flywheel means rotating at generally similar angular velocities.

4. The apparatus of claim 1, said first, second and third flywheel means being geared into each other, such that the rotational movement of one of said first, second and third flywheel means is transmitted to other of said first, second and third flywheel means.

5. The apparatus of claim 1, said first, second and third flywheel means being the rotors of electric motors.

6. The apparatus of claim 1, said frame means being an enclosure containing said first, second and third flywheel means, said shafts of said first, second and third flywheel means being supported within the walls of said enclosure by bearing arrangements.

7. The device of claim 1, wherein said enclosure is evacuated.

8. The device of claim 1, wherein said first, second and third flywheels are the rotors of electric motors.

9. An energy storage device comprising:
    a first flywheel mounted on a first shaft extending in a first plane between a first bearing and a second bearing;
    an enclosure with a wall in which said first bearing is embedded and with an opening through a wall on the opposite side of said enclosure in which said second bearing is attached to said enclosure and through which said first shaft protrudes;
    a second flywheel mounted on a second shaft extending in a second plane perpendicular to said first plane between a third bearing and a fourth bearing, said third and fourth bearings being embedded in the walls of said enclosure;
    a third flywheel mounted on a third shaft extending in a third plane perpendicular to said second plane and perpendicular to said first plane between a fifth bearing and a sixth bearing, said fifth and sixth bearings being embedded in the walls of said enclosure;
    a first beveled gear mounted on said first shaft meshing with a second beveled gear mounted on said second shaft, whereby rotary motion and torque of said first shaft is transmitted to said second shaft; and
    a third beveled gear mounted on said first shaft meshing with a fourth beveled gear mounted on said third shaft, whereby rotary motion and torque of said first shaft is transmitted to said third shaft.

* * * * *